(12) United States Patent
Strijker

(10) Patent No.: US 10,630,169 B1
(45) Date of Patent: Apr. 21, 2020

(54) POWER FACTOR CORRECTION AT SWITCHED MODE POWER SUPPLY

(71) Applicant: NXP B.V., Eindhoven (NL)

(72) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/457,013

(22) Filed: Jun. 28, 2019

(51) Int. Cl.
*H02M 1/42* (2007.01)
*H02M 1/08* (2006.01)
*H02M 3/156* (2006.01)
*H02J 3/18* (2006.01)
*H02J 3/01* (2006.01)

(52) U.S. Cl.
CPC ......... *H02M 1/4225* (2013.01); *H02M 1/08* (2013.01); *H02M 3/156* (2013.01); *H02J 3/01* (2013.01); *H02J 3/18* (2013.01); *H02M 1/42* (2013.01)

(58) Field of Classification Search
CPC ...... H02M 1/4225; H02M 1/08; H02M 3/156; H02M 1/42; H02J 3/01; H02J 3/18
See application file for complete search history.

(56) References Cited

U.S. PATENT DOCUMENTS 8,767,418 B2 * 7/2014 Jungreis .................. H02M 1/08
323/238
10,008,945 B2 * 6/2018 Satoh ...................... H02M 1/08

OTHER PUBLICATIONS

Sun, Bosheng, "Increase power factor by digitally compensating for PFC EMI-capacitor reactive current", Texas Instruments Analog Applications Journal, pp. 23-28 (2016).

* cited by examiner

*Primary Examiner* — Kyle J Moody

(57) ABSTRACT

Embodiments of a method and a device are disclosed. In an embodiment, a method for power factor correction (PFC) at a switched mode power supply (SMPS) is disclosed. The method involves receiving an input voltage, generating a reference waveform that is in phase with the input voltage, determining a time value for phase-shifting a PFC current signal, scaling the time value with a phase factor to generate a scaled time value, phase-shifting the reference waveform according to the scaled time value to generate a phase-shifted reference waveform, and generating the PFC current signal based on the phase-shifted reference waveform.

20 Claims, 12 Drawing Sheets

POWER FACTOR CORRECTION AT SWITCHED MODE POWER SUPPLY

BACKGROUND

A power supply is an electrical device that supplies electric power to an electrical load. The primary function of a power supply is to convert electric voltage and current from a source to the correct voltage and current to power the load. As a result, power supplies are sometimes referred to as electric power converters.

A power factor (PF) of an alternating current (AC) electrical power system is defined as the ratio of a real power absorbed by a load to an apparent power flowing in a circuit, and is a dimensionless number in the closed interval of −1 to 1. A power factor of less than one indicates the voltage and current are not in phase, reducing the instantaneous product of the two. Real power is the instantaneous product of voltage and current and represents the capacity of the electricity to perform work. Apparent power is the average product of current and voltage. Due to energy stored in the load and returned to the source, or due to a non-linear load that distorts the wave shape of the current drawn from the source, the apparent power may be greater than the real power. A negative power factor occurs when the device (which is normally the load) generates power, which then flows back towards the source.

In an electric power system, a load with a low power factor draws more current than a load with a high power factor for the same amount of useful power transferred. Power factor correction (PFC) increases the power factor of a load, improving efficiency for the distribution system to which it is attached. Linear loads with a low power factor (such as induction motors) can be corrected with a passive network of capacitors or inductors. Non-linear loads, such as rectifiers, distort the current drawn from the system. In such cases, active or passive power factor correction may be used to counteract the distortion and raise the power factor.

Capacitors for filtering input current noise (electromagnetic interference (EMI) filter capacitors) in PFC circuits may cause a lower PF for a switched mode power supply (SMPS). However, depending on the location of the EMI filter capacitors in a PFC circuit (e.g., after a bridge rectifier), a total harmonic distortion (THD) may increase, especially at low output loads of the SMPS. As such, a PFC technique is needed that can improve the PF while reducing the THD in the SMPS.

SUMMARY

Embodiments of a method and a device are disclosed. In an embodiment, a method for power factor correction (PFC) at a switched mode power supply (SMPS) is disclosed. The method involves receiving an input voltage, generating a reference waveform that is in phase with the input voltage, determining a time value for phase-shifting a PFC current signal, scaling the time value with a phase factor to generate a scaled time value, phase-shifting the reference waveform according to the scaled time value to generate a phase-shifted reference waveform, and generating the PFC current signal based on the phase-shifted reference waveform.

In an embodiment of the method, the time value is determined according to an equation: time value=arctan($C*\omega*Vac/Iac$)/$\omega$, where C is a total capacitance of one or more electromagnetic interference (EMI) filter capacitors in the SMPS, $\omega$ is a frequency of the input voltage, Vac is the input voltage, and Iac is a regulating current signal.

In an embodiment of the method, the regulating current signal regulates an output voltage of the SMPS to a target reference voltage.

In an embodiment of the method, the phase factor is a value greater than 0 and less than 1.

In an embodiment of the method, generating the PFC current signal based on the phase-shifted reference waveform involves multiplying the phase-shifted reference waveform with a regulating current signal to generate a phase-shifted current signal, and rectifying the phase-shifted current signal to generate the PFC current signal.

In an embodiment of the method, the method further involves outputting the PFC current signal when both the input voltage and a voltage of the phase-shifted reference waveform have a value greater than zero, or both the input voltage and the voltage of the phase-shifted reference waveform have a value less than zero.

In an embodiment of the method, the SMPS includes a power stage, the method further involving receiving the PFC current signal at a pulse width modulator (PWM) in the power stage, and outputting a PWM signal from the PWM to a switch such that an average current in an inductor in the power stage is equal to the PFC current signal.

In an embodiment of the method, determining the time value for phase-shifting the PFC current signal involves generating an input current waveform based on a frequency of the input voltage and a regulating current signal, generating a capacitor current waveform based on the input voltage, the frequency of the input voltage, and a total capacitance of one or more electromagnetic interference (EMI) filter capacitors in the SMPS, comparing the capacitor current waveform to the input current waveform, and determining the time value based on a time when the input current waveform is equal to the capacitor current waveform.

In an embodiment of the method, the input current waveform is generated according to an equation: input current waveform=$Iac*\sin(\omega t)$, where Iac is the regulating current signal, $\omega$ is the frequency of the input voltage, and t is a value greater than 0.

In an embodiment of the method, the capacitor current waveform is generated according to an equation: capacitor current waveform=$C*\omega*Vac*\cos(\omega t)$, where C is the total capacitance of the one or more EMI filter capacitors, $\omega$ is the frequency of the input voltage, Vac is the input voltage, and t is a value greater than 0.

In an embodiment, a switched mode power supply (SMPS) configured for power factor correction (PFC) is disclosed. The SMPS includes a reference signal generating circuit configured to receive an input voltage and generate a reference waveform that is in phase with the input voltage, a processing circuit configured to determine a time value for phase-shifting a PFC current signal, a scaling circuit configured to scale the time value with a phase factor to generate a scaled time value, a phase-shifted signal generating circuit configured to phase-shift the reference waveform according to the scaled time value to generate a phase-shifted reference waveform, and a PFC signal generating circuit configured to generate the PFC current signal based on the phase-shifted reference waveform.

In an embodiment of the SMPS, the processing circuit is configured to determine the time value according to an equation: time value=arctan($C*\omega*Vac/Iac$)/$\omega$, where C is a total capacitance of one or more electromagnetic interference (EMI) filter capacitors in the SMPS, $\omega$ is a frequency of the input voltage, Vac is the input voltage, and Iac is a regulating current signal.

In an embodiment of the SMPS, the regulating current signal regulates an output voltage of the SMPS to a target reference voltage.

In an embodiment of the SMPS, the phase factor is a value greater than 0 and less than 1.

In an embodiment of the SMPS, the PFC signal generating circuit configured to generate the PFC current signal is further configured to multiply the phase-shifted reference waveform with the regulating current signal to generate a phase-shifted current signal, and rectify the phase-shifted current signal to generate the PFC current signal.

In an embodiment of the SMPS, the SMPS further includes a switching circuit configured to output the PFC current signal when both the input voltage and a voltage of the phase-shifted reference waveform have a value greater than zero, or both the input voltage and the voltage of the phase-shifted reference waveform have a value less than zero.

In an embodiment of the SMPS, the SMPS further includes a power stage comprising a pulse width modulator (PWM), a switch coupled to the PWM, and an inductor coupled to the switch, wherein the PWM is configured to receive the PFC current signal and output a PWM signal to the switch such that an average current in the inductor is equal to the PFC current signal.

In an embodiment of the SMPS, the processing circuit configured to determine the time value is further configured to generate an input current waveform based on a frequency of the input voltage and a regulating current signal, generate a capacitor current waveform based on the input voltage, the frequency of the input voltage, and a total capacitance of one or more electromagnetic interference (EMI) filter capacitors in the SMPS, compare the capacitor current waveform to the input current waveform, and determine the time value based on a time when the input current waveform is equal to the capacitor current waveform.

In an embodiment of the SMPS, the processing circuit is configured to generate the input current according to an equation: input current waveform=Iac*sin(ωt), where Iac is the regulating current signal, ω is the frequency of the input voltage, and t is a value greater than 0.

In an embodiment of the SMPS, the processing circuit is configured to generate the capacitor current waveform according to an equation: capacitor current waveform=C*ω*Vac*cos(ωt), where C is the total capacitance of the one or more EMI filter capacitors, ω is the frequency of the input voltage, Vac is the input voltage, and t is a value greater than 0.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
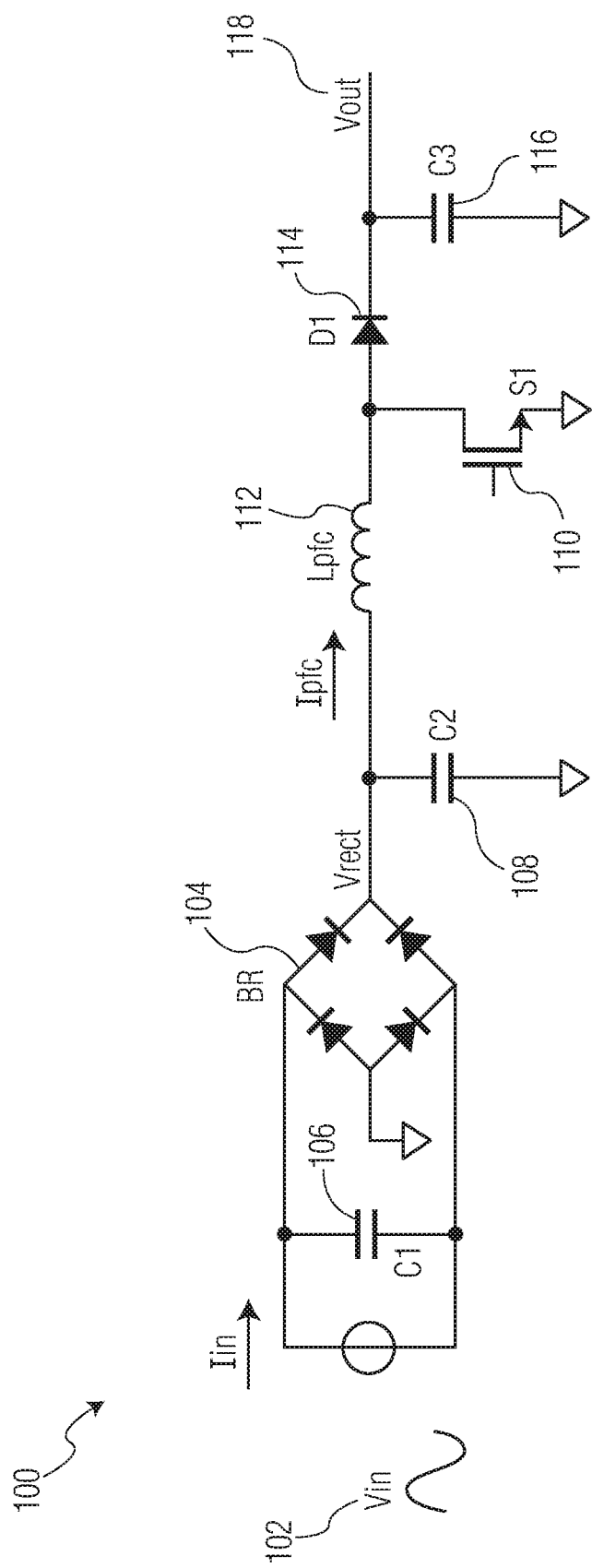
FIG. 1 depicts an example of a switched mode power supply (SMPS) with a boost type power factor correction (PFC) circuit.

FIG. 1 depicts an example of a switched mode power supply (SMPS) 100 with a boost type power factor correction (PFC) circuit. The SMPS 100 includes an AC mains input voltage (Vin) 102, a bridge rectifier (BR) 104, a first capacitor (C1) 106, a second capacitor (C2) 108, a switching element (S1) 110, an inductor (Lpfc) 112, a rectifier diode (D1) 114, and an output capacitor (C3) 116.

The AC mains input voltage (Vin) 102 supplies voltage to the SMPS 100. The first capacitor (C1) 106 and the second capacitor (C2) 108 are filter capacitors for electromagnetic interference (EMI). In some applications, common mode and differential mode inductors may also be present. The bridge rectifier (BR) 104 is employed to convert the AC mains input voltage (Vin) 102 to a rectified input voltage (Vrect). The rectified input voltage (Vrect) is used to produce a PFC current (Ipfc), which is a switching current having a switching frequency of 100 KHz, for example.

A power stage of the SMPS 100 may include the switching element (S1) 110, the inductor (Lpfc) 112, the rectifier diode (D1) 114, and the output capacitor (C3) 116. An output voltage (Vout) 118 of the power stage may typically be higher than a peak of the AC mains input voltage (Vin) 102. In some applications, an output of the power stage may be connected to another SMPS, e.g., a flyback circuit or a LLC circuit.

Figure 2:
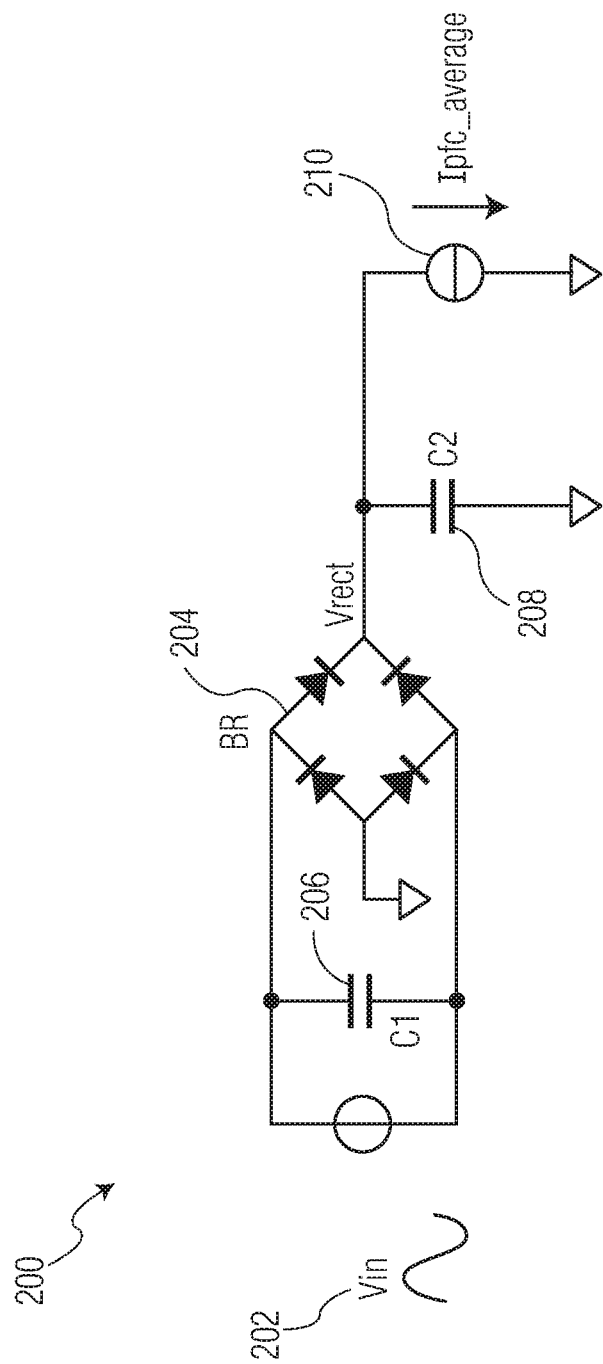
FIG. 2 depicts a simplified example of a SMPS with a boost type PFC circuit.

FIG. 2 depicts a simplified example of a switched mode power supply (SMPS) 200 with a boost type power factor correction (PFC) circuit. The SMPS 200 is a simplified model of the SMPS 100 shown in FIG. 1. The SMPS 200 includes an AC mains input voltage (Vin) 202, a bridge rectifier (BR) 204, a first capacitor (C1) 206, a second capacitor (C2) 208, and a current source 110.

The AC mains input voltage (Vin) 202 supplies voltage to the SMPS 200. The first capacitor (C1) 206 and the second capacitor (C2) 208 are filter capacitors for electromagnetic interference (EMI). In some applications, common mode and differential mode inductors may also be present. The bridge rectifier (BR) 204 is employed to convert the AC mains input voltage (Vin) 202 to a rectified input voltage (Vrect). The rectified input voltage (Vrect) is used to produce an average PFC current (Ipfc_average). Notably, unlike FIG. 1 where Ipfc is a switching current, Ipfc_average in FIG. 2 represents an average of the switching current. Therefore, the current source 210 is depicted in FIG. 2 corresponding to the average of the switching current as opposed to a switching element (S1), an inductor (Lpfc), a rectifier diode (D1), and/or an output capacitor (C3), as depicted in FIG. 1.

Figure 3:
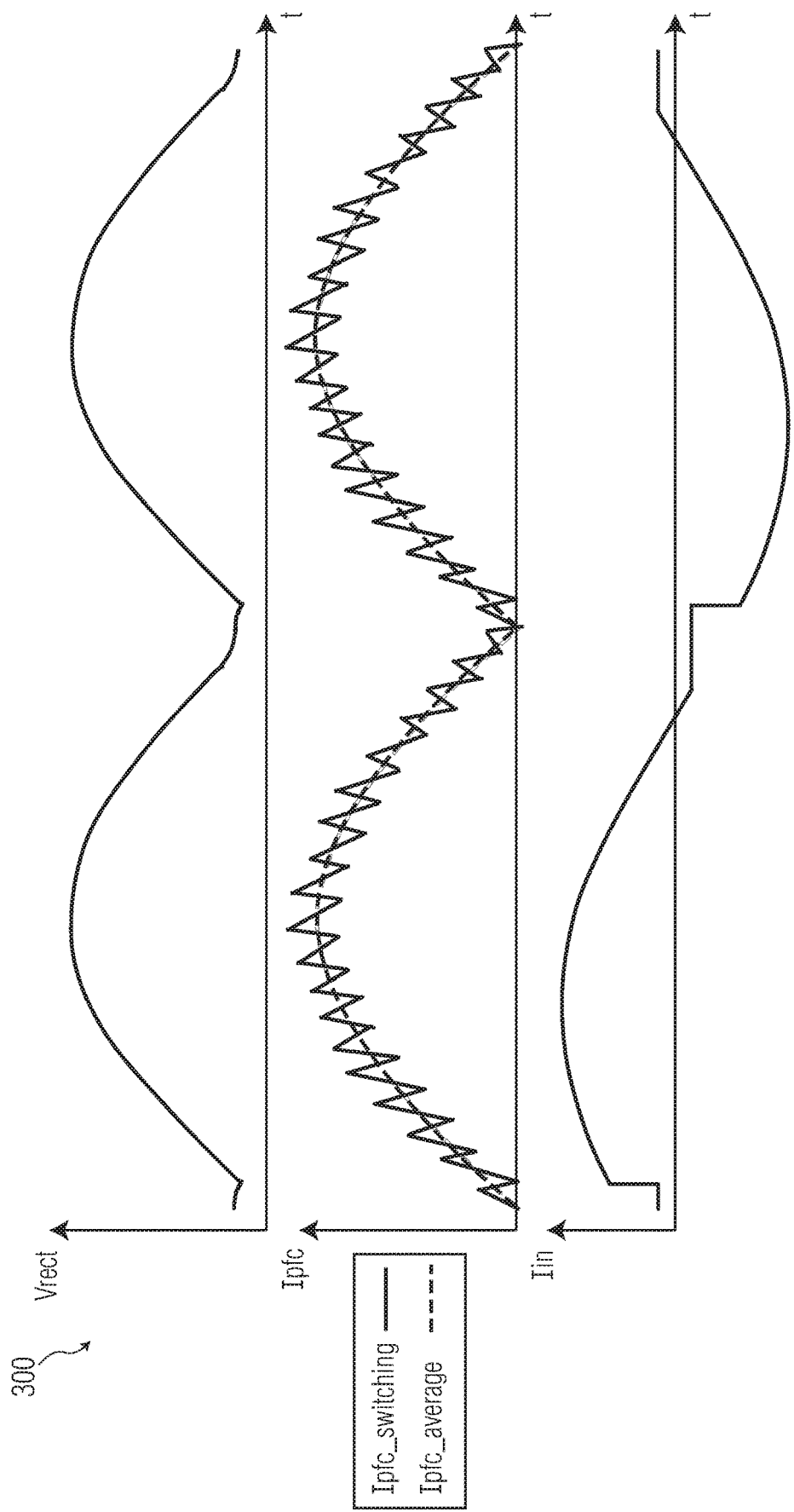
FIG. 3 depicts waveforms of a conventional SMPS having a PFC circuit.

FIG. 3 depicts waveforms 300 of a conventional SMPS having a PFC circuit. The waveforms shown include a voltage waveform for a rectified input voltage (Vrect) and current waveforms for a switching PFC current (Ipfc_switching), an average PFC current (Ipfc_average), and an input current (Iin). Notably, the switching PFC current (Ipfc_switching) is not drawn to horizontal scale in FIG. 3. The switching PFC current (Ipfc_switching) may have a switching frequency of 100 KHz, for example. The average PFC current (Ipfc_average) is an average of the switching PFC current (Ipfc_switching) and is in phase with a mains input voltage (Vin). The mains input voltage may typically have a frequency of 50 Hz or 60 Hz, for example.

Figure 4:
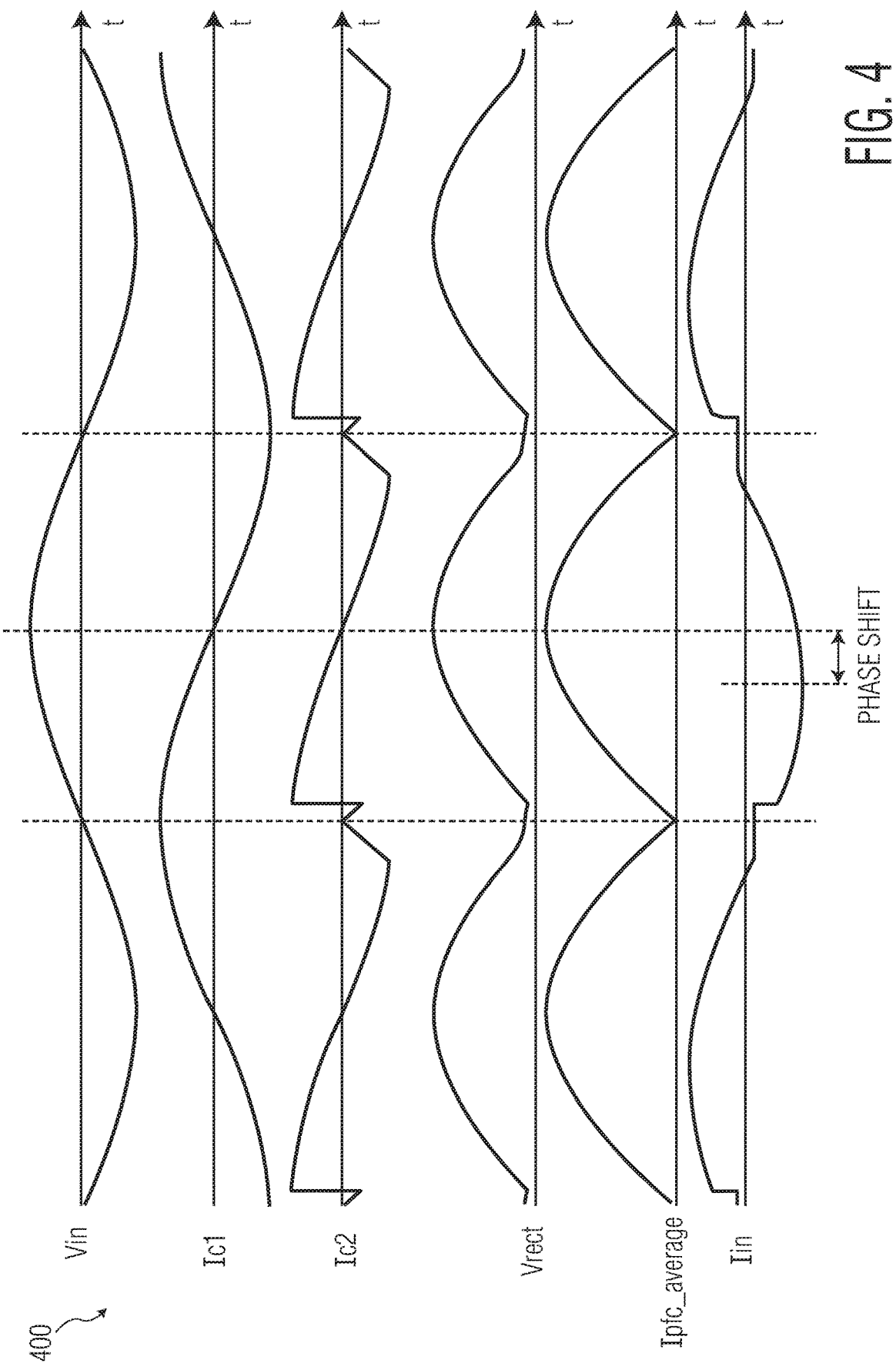
FIG. 4 depicts waveforms of a conventional SMPS having a PFC circuit including EMI filter capacitor current waveforms.

FIG. 4 depicts waveforms 400 of a conventional SMPS having a PFC circuit including EMI filter capacitor current waveforms. The waveforms shown include voltage waveforms for a mains input voltage (Vin) and a rectified input voltage (Vrect) and current waveforms for a first capacitor current (Ic1), a second capacitor current (Ic2), an average PFC current (Ipfc_average), and an input current (Iin). The input current (Iin) is equal to a sum of the first capacitor current (Ic1), the second capacitor current (Ic2), and the average PFC current (Ipfc_average).

A power factor (PF) of an AC electrical power system may be defined as the ratio of a real power absorbed by a load to an apparent power flowing in a circuit (PF=Real Power/Apparent Power). Real power is the instantaneous product of voltage and current and represents the capacity of the electricity for performing work. Apparent power is the average product of current and voltage.

Ideally, PF should be a value of 1 (PF=1). A power factor of less than one indicates that the voltage and current are not in phase, reducing the instantaneous product of the two. Here, when PF=1, the SMPS appears as a resistor to the mains input voltage (Vin), and the input current (Iin) is in phase with the mains input voltage (Vin).

However, as shown in FIG. 4, the first capacitor current (Ic1) is phase-shifted 90 degrees with respect to the mains input voltage (Vin). The input current (Iin) is phase-shifted approximately 30 degrees with respect to the mains input voltage (Vin). Hence, the power factor corresponding to the waveforms of FIG. 4 is not equal to 1. Although the average PFC current (Ipfc_average) is in phase with the mains input voltage (Vin), the input current (Iin), which is the sum of the first capacitor current (Ic1), the second capacitor current (Ic2), and the average PFC current (Ipfc_average), is not in phase with the mains input voltage (Vin) due to the presence of the capacitor currents Ic2 and Ic2. In addition to the power factor not being equal to 1, the input current (Iin) is not an ideal sine wave. The distortion on the input current (Tin) results in higher harmonics, meaning that the total harmonic distortion (THD) is greater than zero.

Figure 5:
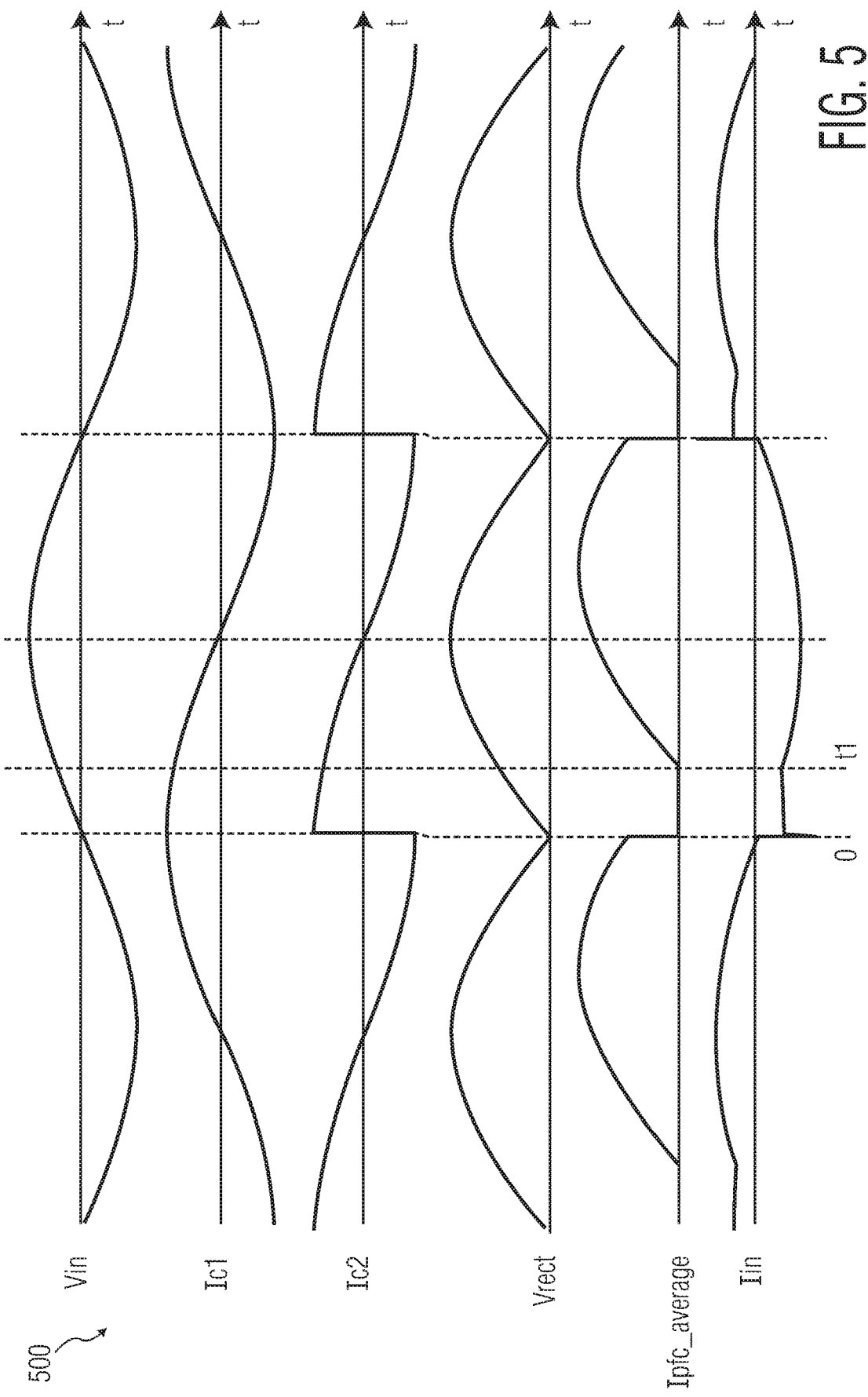
FIG. 5 depicts waveforms of a SMPS having a PFC circuit including a PFC current waveform that is phased-shifted according to a conventional method.

FIG. 5 depicts waveforms 500 of a SMPS having a PFC circuit including a PFC current waveform that is phased-shifted according to a conventional method. The waveforms shown include voltage waveforms for a mains input voltage (Vin) and a rectified input voltage (Vrect) and current waveforms for a first capacitor current (Ic1), a second capacitor current (Ic2), an average PFC current (Ipfc_average), and an input current (Iin). The input current (Iin) is equal to a sum of the first capacitor current (Ic1), the second capacitor current (Ic2), and the average PFC current (Ipfc_average).

As shown in FIG. 5, the average PFC current (Ipfc_average) is phase-shifted by a time t1 according to a conventional method for improving a power factor. Accordingly, the input current (Iin) is now in phase with the mains input voltage (Vin) (as opposed to the input current of FIG. 4 that is not in phase with the mains input voltage). As such, phase-shifting the average PFC current (Ipfc_average) by the time t1 causes the power factor to improve (e.g., with respect to the power factor of FIG. 4). However, although the power factor has improved, as shown in FIG. 5, the input current (Iin) is still largely distorted. Large distortion on the input current (Iin) indicates that the total harmonic distortion (THD) is not at a lowest possible value.

Figure 6:
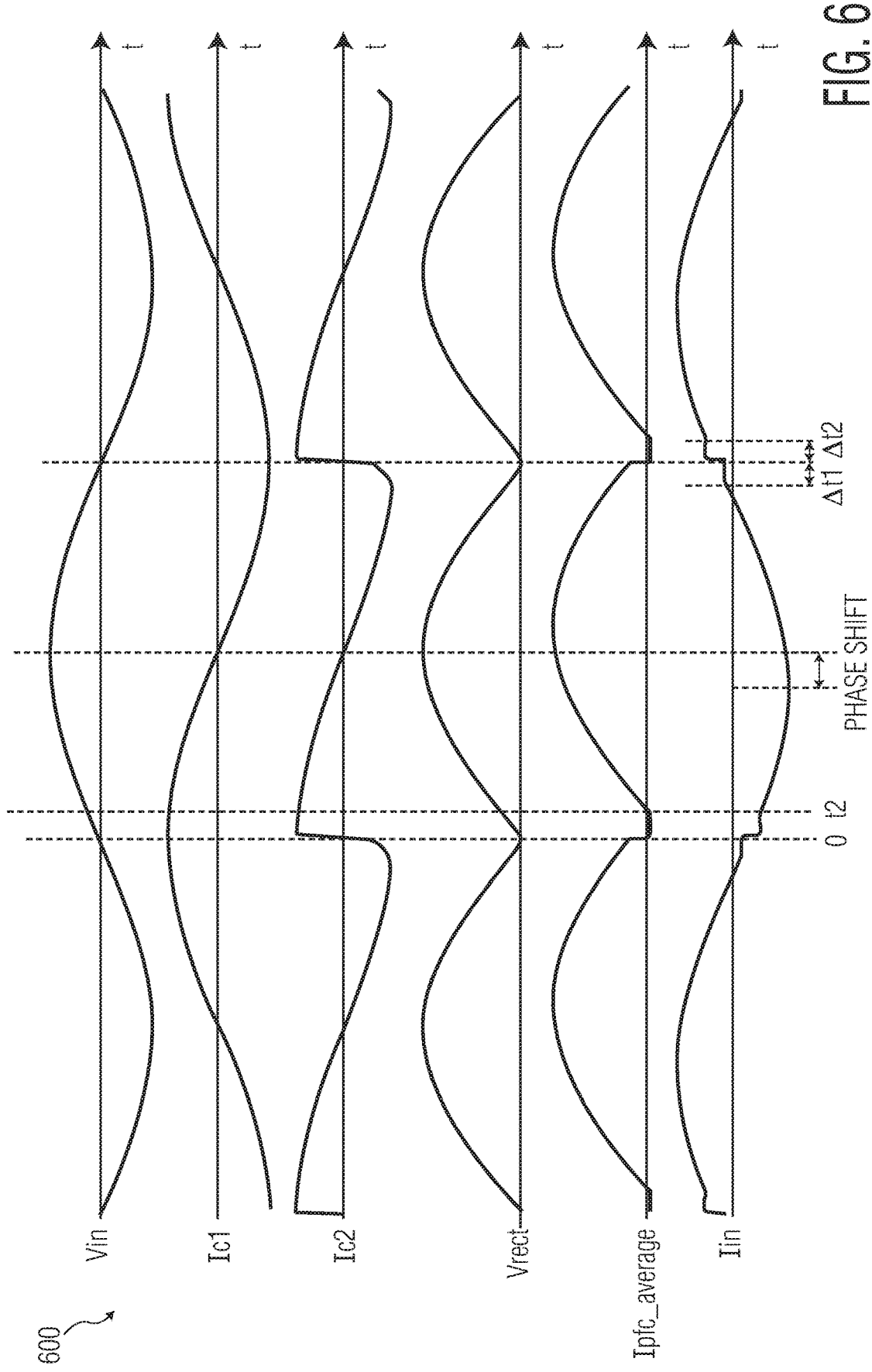
FIG. 6 depicts waveforms of a SMPS having a PFC circuit including a PFC current waveform that is phase-shifted according to a method of the present disclosure.

FIG. 6 depicts waveforms 600 of a SMPS having a PFC circuit including a PFC current waveform that is phase-shifted according to a method of the present disclosure. The waveforms shown include voltage waveforms for a mains input voltage (Vin) and a rectified input voltage (Vrect) and current waveforms for a first capacitor current (Ic1), a second capacitor current (Ic2), an average PFC current (Ipfc_average), and an input current (Iin). The input current (Iin) is equal to a sum of the first capacitor current (Ic1), the second capacitor current (Ic2), and the average PFC current (Ipfc_average).

As shown in FIG. 6, the average PFC current (Ipfc_average) is partially phase-shifted by a time t2 according to a method of the present disclosure for improving a power factor. Accordingly, a small phase shift exists between the input current (Iin) and the mains input voltage (Vin). As such, partially phase-shifting the average PFC current (Ipfc_average) by the time t2 causes the power factor to improve over the power factor realized in FIG. 4. However, the partial phase-shift of the average PFC current by the time t2 may not improve the power factor over the power factor realized in FIG. 5. Nonetheless, in FIG. 6, the distortion on the input current (Iin) is significantly reduced as compared to the distortion on the input current shown in FIG. 5. The reduced distortion on the input current (Iin) indicates that the total harmonic distortion (THD) shown in FIG. 6 is significantly improved over the THD shown in FIG. 5. Therefore, while partially phase-shifting the average PFC current (Ipfc_average) by the time t2 may lead to a lesser improved power factor, a greater improved THD is realized.

Figure 7:
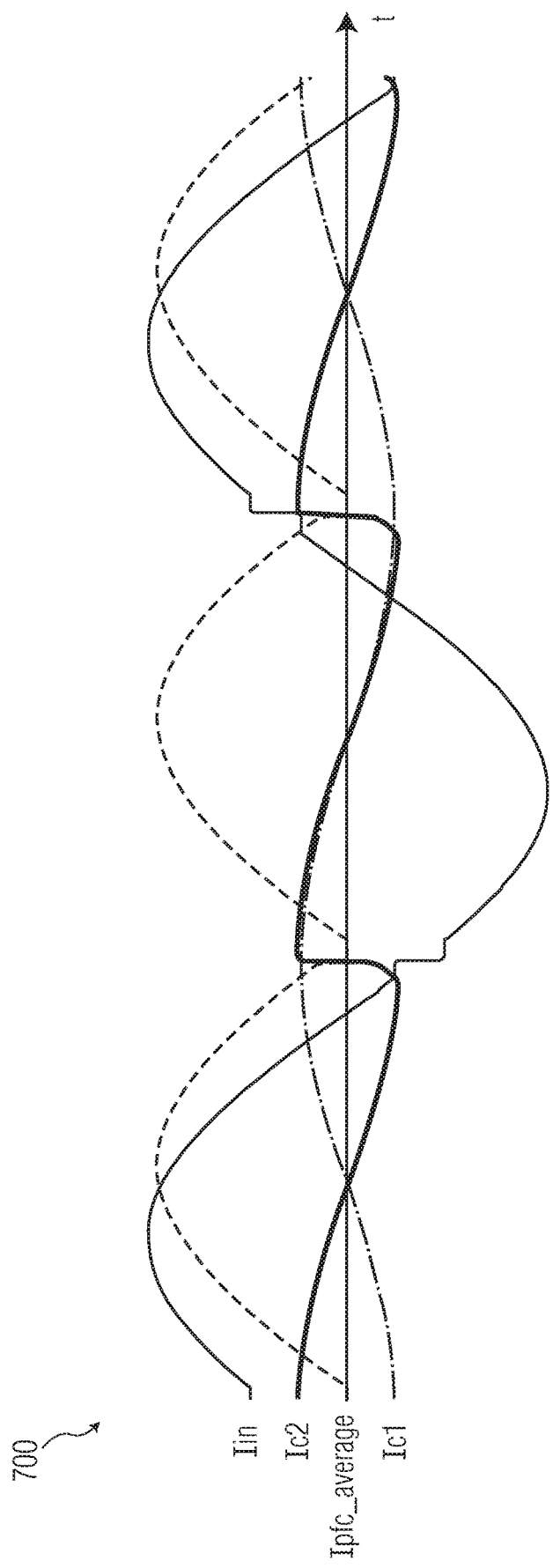
FIG. 7 depicts waveforms of a SMPS having a PFC circuit, which are a subset of the waveforms depicted in FIG. 6.

FIG. 7 depicts waveforms 700 of a SMPS having a PFC circuit, which are a subset of the waveforms depicted in FIG. 6. The waveforms shown include the current waveforms for the first capacitor current (Ic1), the second capacitor current (Ic2), the average PFC current (Ipfc_average), and the input current (Iin). In FIG. 7, the current waveforms are depicted on one vertical scale to demonstrate how the sum of the first capacitor current (Ic1), the second capacitor current (Ic2), and the average PFC current (Ipfc_average) is equal to the input current (Iin).

In an embodiment, an input voltage Vin(t) may be determined by equation (1):

$$Vin(t)=Vac*\sin(\omega t), \text{ where } Vac \text{ is a peak mains input voltage and } \omega \text{ is a mains input voltage frequency in radians/second.} \quad (1)$$

In an embodiment, for the SMPS to behave like a resistive load on the mains input voltage, an input current Iin(t) may be determined by equation (2):

$$Iin(t)=Iac*\sin(\omega t), \text{ where } Iac \text{ is a current for regulating an output voltage to a target reference voltage.} \quad (2)$$

In an embodiment, a total capacitor current Ic(t) may be determined by equation (3):

$$Ic(t)=C*dVin(t)/dt=C*\omega*Vac*\cos(\omega t), \text{ where } C \text{ is a sum of all EMI filter capacitors (e.g., } C=C1+C2). \quad (3)$$

In an embodiment, a PFC current Ipfc(t) is determined by equation (4):

$$Ipfc(t)=Iin(t)-Ic(t)=Iac*\sin(\omega t)-C*\omega*Vac*\cos(\omega t). \quad (4)$$

In an embodiment, a phase-shifted PFC current may begin at t=t1, where t1 is a point in time when a waveform for the input current Iin(t) and a waveform for the capacitor current Ic(t) intersect (e.g., Iin(t1)=Ic(t1)). Accordingly, a value of t1 may be determined according to equations (5) to (8):

$$Iin(t1)=Ic(t1) \rightarrow Iac*\sin(\omega t1)=C*\omega*Vac*\cos(\omega t1), \text{ which is equivalent to equation (6).} \quad (5)$$

$$\sin(\omega t1)/\cos(\omega t1)=C*\omega*Vac/Iac, \text{ which is equivalent to equation (7),} \quad (6)$$

$$\tan(\omega t1)=C*\omega*Vac/Iac, \text{ and therefore, } t1 \text{ may be determined by equation (8),} \quad (7)$$

$$t1=\arctan(C*\omega*Vac/Iac)/\omega. \quad (8)$$

In an embodiment, a partially phase-shifted PFC current may begin at t=t2. A value of t2 may be determined by equation (9):

$$t2=\alpha*t1, \text{ wherein } \alpha \text{ is a phase factor.} \quad (9)$$

Notably, a phase factor α having a value equal to 0 (α=0) may yield a power factor (PF) and total harmonic distortion (THD) similar to the PF and THD described with respect to FIG. 4. Moreover, a phase factor α having a value equal to 1 (α=1) may yield a PF and THD similar to the PF and THD described with respect to FIG. 5. Accordingly, an embodiment of the present disclosure implements a phase factor α having a value between 0 and 1. By selecting the phase factor α to be larger than 0 but smaller than 1, the PF and THD can be optimized dependent on application requirements.

Figure 8:
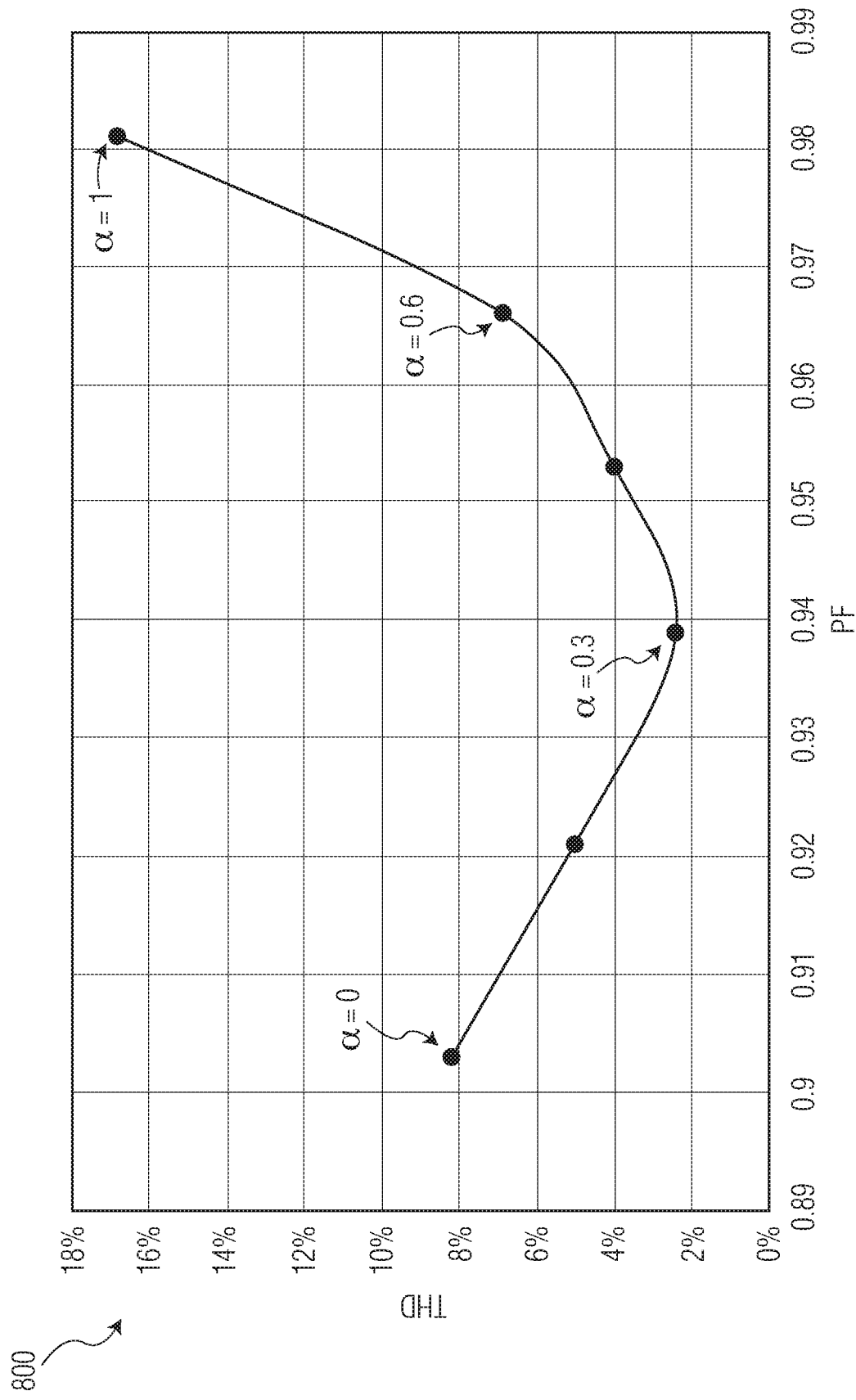
FIG. 8 is a graph of total harmonic distortion (THD) versus power factor (PF) for an example application.

FIG. 8 is a graph 800 of total harmonic distortion (THD) versus power factor (PF) for an example application. As shown, a lowest THD is realized by implementing a phase factor α equal to 0.3 (α=0.3) for the example application. Compared to a conventional phase-shifting method for improving a power factor (where α=0), the PF has improved from approximately 0.90 to approximately 0.94 while the THD has improved from approximately 8% to approximately 2%. If a better PF is required, the phase factor α can be set to larger value at the cost of a higher THD.

In an embodiment, the THD can be optimized by minimizing the distortion on the input current Iin. Referring back to FIG. 6, a minimum distortion on the input current Iin is reached when Δt1=Δt2. A phase factor α for a lowest THD depends on a total capacitance before and after a bridge rectifier (e.g., BR 104). For low capacitance after the bridge rectifier, a low phase factor α may be set, e.g., α=0.2. For high capacitance after the bridge rectifier, the phase factor α may be set to a higher value, e.g. α=0.5.

Figure 9:
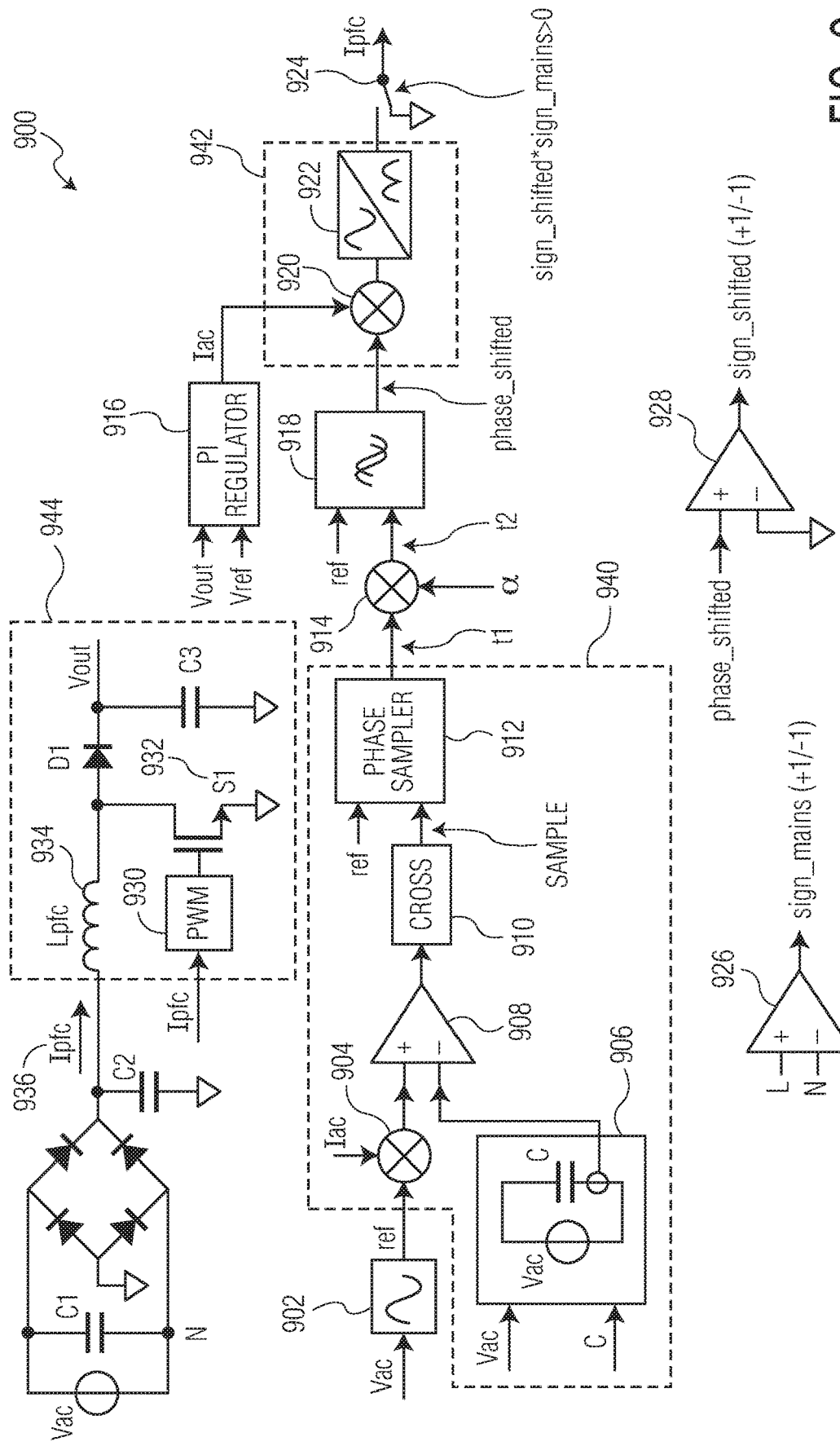
FIG. 9 depicts components of an analog implementation of a SMPS having a PFC circuit.

FIG. 9 depicts components of an analog implementation of a SMPS 900 having a PFC circuit. A proportional integral (PI) regulator 916 generates a regulating current signal (Iac) intended to regulate an output voltage (Vout) to a target voltage (Vref). A reference signal generating circuit 902 generates a sine wave reference signal (ref), which is in phase with a mains input voltage (Vac). Examples of the reference signal generating circuit 902 are discussed with respect to FIGS. 11A and 11B below.

A processing circuit 940 configured to determine a time value for phase-shifting a PFC current (Ipfc) includes a multiplier 904, a capacitor current circuit 906, a comparator 908, a crossing-point determiner 910, and a phase sampler 912. The sine wave reference signal (ref) is multiplied by the regulating current signal (Iac) via a multiplier 904. An output of the multiplier 904 is a sine wave signal (Iin(t)) with an amplitude proportional to Iac (Iin(t)=Iac*sin(ωt)). The capacitor current circuit 906 outputs a sine wave signal (Ic(t)) with an amplitude proportional to a sum of EMI filter capacitor currents present in the SMPS 900, e.g., Ic1+Ic2=Ic(t)=C*ω*Vac*cos(ωt), where C=C1+C2.

In an embodiment, the PFC current (Ipfc) may be phase-shifted by a time value t=t1, where t1 is a point in time when an input current waveform intersects (or is equal to) a capacitor current waveform. Accordingly, the output of the multiplier 904 and the output of the capacitor current circuit 906 are compared by the comparator 908. An output of the comparator 908 switches at a time value (t=t1) when the output of the multiplier 904 is equal to the output of the capacitor current circuit 906 (e.g., at t=t1: Iac*sin(ωt1)= C*ω*Vac*cos(ωt1)). The crossing-point determiner 910 determines a point where the sine wave signal outputted by the multiplier 904 intersects the sine wave signal outputted by the capacitor current circuit 906.

A phase sampler 912 samples a phase of the sine wave reference signal (ref) based on the intersection point determined by the crossing-point determiner 910. The sampled phase corresponds to a time value t=t1. The time value t1 is scaled by a phase factor α via a scaling circuit (e.g., multiplier) 914 to generate a scaled time value t2. The scaled time value t2 may be used to partially phase-shift the PFC current (Ipfc).

A phase-shifted signal generating circuit (e.g., sine generator) 918 generates a phase-shifted sine wave signal by phase-shifting the sine wave reference signal (ref) by the scaled time value t2. A PFC signal generating circuit 942 configured to generate the PFC current (Ipfc) includes a multiplier 920 and a rectifier 922. The multiplier 920 multiplies an output signal (Iac) of the PI regulator 916 with the phase-shifted sine wave signal. An output of the multiplier 920 is rectified by the rectifier 922 to generate a rectified signal (PFC current signal (Ipfc)). The rectified signal is switched by a switch 924 to output an intended PFC current signal (Ipfc).

In an embodiment, the switch 924 is closed to output the intended PFC current signal (Ipfc) when a phase-shifted voltage and the mains input voltage (Vac) are either both positive or both negative in value (e.g., sign_shifted* sign_mains>0). A determination of whether the mains input voltage (Vac) is positive or negative may be performed by a mains input voltage sign comparator 926. A determination of whether the phase-shifted voltage is positive or negative may be performed by a phase-shifted voltage comparator 928.

A power stage 944 of the SMPS 900 includes at least a pulse width modulator (PWM) 930, a switch (S1) 932, and an inductor (Lpfc) 934. The PWM 930 receives the intended PFC current signal (Ipfc) and outputs a PWM signal to the switch (S1) 932 such that an average current in an inductor (Lpfc) 934 is equal to the intended PFC current signal (Ipfc). In an embodiment, the PWM 930 may be, for example, a hysteretic control module in which (Ipk_high+Ipk_low)/2=Ipfc, where Ipk_high is a maximum current in the inductor (Lpfc) 934 and Ipk_low is a minimum current in the inductor (Lpfc) 934.

Figure 10:
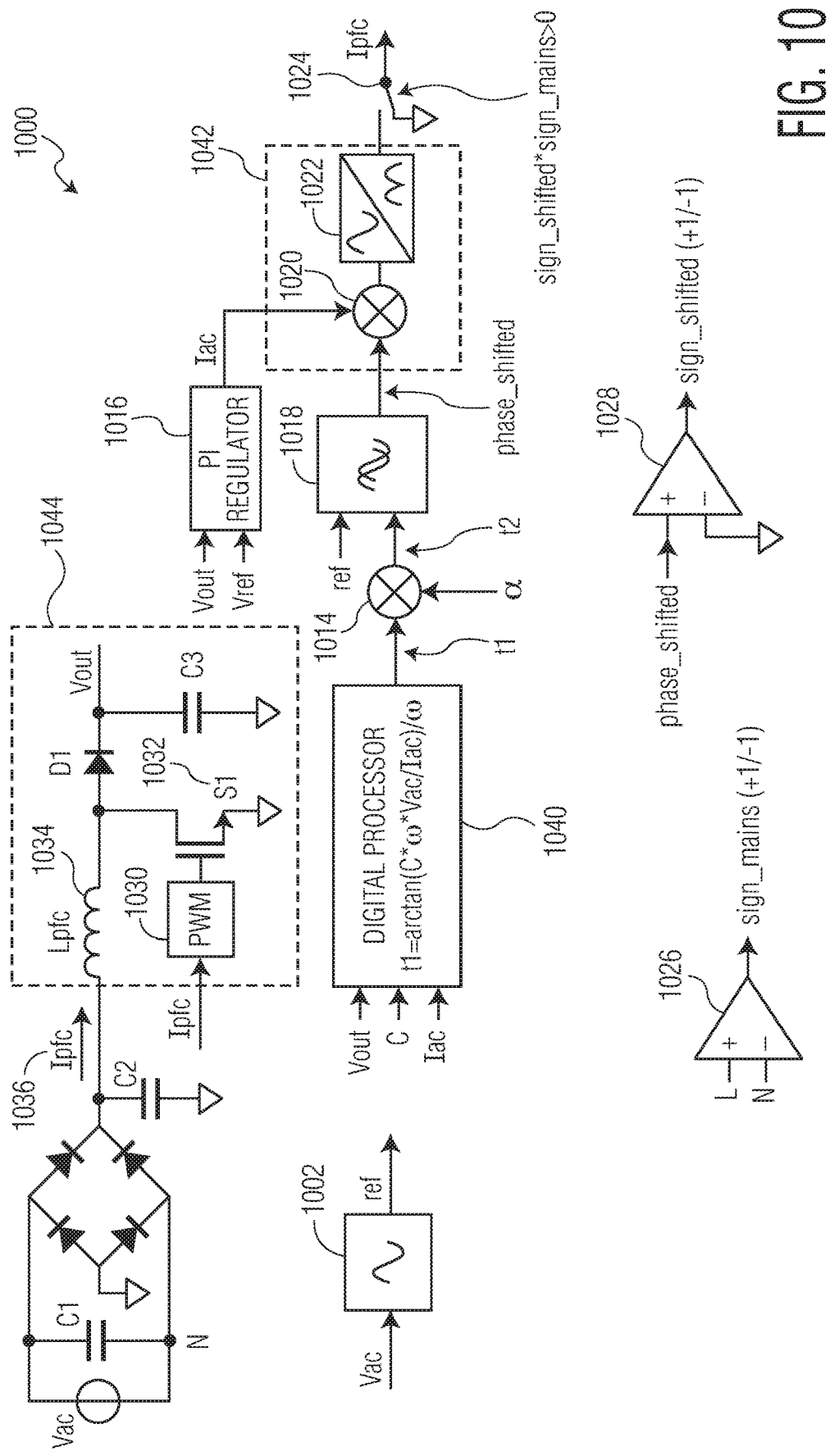
FIG. 10 depicts components of a digital implementation of a SMPS having a PFC circuit.

FIG. 10 depicts components of a digital implementation of a SMPS 1000 having a PFC circuit. In an embodiment, all signals (e.g., t1, t2, Iac, Ipfc, etc.) described with respect to FIG. 10 are digital signals. Moreover, all circuit elements described with respect to FIG. 10 are digital state machines or digital processors.

A proportional integral (PI) regulator 1016 generates a regulating current signal (Iac) intended to regulate an output voltage (Vout) to a target voltage (Vref). A reference signal generating circuit 1002 generates a sine wave reference signal (ref), which is in phase with a mains input voltage (Vac). Examples of the reference signal generating circuit 1002 are discussed with respect to FIGS. 11A and 11B below.

In an embodiment, a PFC current (Ipfc) may be phase-shifted by a time value t=t1, where t1 is a point in time when an input current waveform intersects a capacitor current waveform. Accordingly, a digital processor 1040 may determine the time value t1 based on the mains input voltage (Vac), the regulating current signal (Iac), a mains input voltage frequency (ω) in radians/second, and a total capacitance of EMI filter capacitors (e.g., C=C1+C2) present in the SMPS 1000. For example, the digital processor 1040 may determine the time t1 value based on the equation below:

$$t1 = \arctan(C*\omega*Vac/Iac)/\omega.$$

The digital processor 1040 outputs the time value t1 to a scaling circuit (e.g., multiplier) 1014. The scaling circuit 1014 scales the time value t1 by a phase factor α to generate a scaled time value t2. The scaled time value t2 may be used to partially phase-shift the PFC current (Ipfc).

A phase-shifted signal generating circuit (e.g., sine generator) 1018 generates a phase-shifted sine wave signal by phase-shifting the sine wave reference signal (ref) by the scaled time t2 value. A PFC signal generating circuit 1042 configured to generate the PFC current (Ipfc) includes a multiplier 1020 and a rectifier 1022. The multiplier 1020 multiplies an output signal (Iac) of the PI regulator 1016 with the phase-shifted sine wave signal. An output of the multiplier 1020 is rectified by the rectifier 1022 to generate a rectified signal (PFC current (Ipfc)). The rectified signal is switched by a switch 1024 to output an intended PFC current signal (Ipfc).

In an embodiment, the switch 1024 is closed to output the intended PFC current signal (Ipfc) when a phase-shifted voltage and the mains input voltage (Vac) are either both positive or both negative in value (e.g., sign_shifted*sign_mains>0). A determination of whether the mains input voltage (Vac) is positive or negative may be performed by a mains input voltage sign comparator 1026. A determination of whether the phase-shifted voltage is positive or negative may be performed by a phase-shifted voltage comparator 1028.

A power stage 1044 of the SMPS 1000 includes at least a pulse width modulator (PWM) 1030, a switch (S1) 1032, and an inductor (Lpfc) 1034. The PWM 1030 receives the intended PFC current signal (Ipfc) and outputs a PWM signal to the switch (S1) 1032 such that an average current in an inductor (Lpfc) 1034 is equal to the intended PFC current signal (Ipfc). In an embodiment, the PWM 1030 may be, for example, a hysteretic control module in which (Ipk_high+Ipk_low)/2=Ipfc, where Ipk_high is a maximum current in the inductor (Lpfc) 1034 and Ipk_low is a minimum current in the inductor (Lpfc) 1034.

In the embodiments described above, the power supply implementing the PFC circuit is a boost type switched mode power supply (SMPS). However, in other embodiments, other types of power supplies, such as a flyback type SMPS, a LCC type SMPS, or any other suitable SMPS for power factor correction may also be used.

Embodiments of the present disclosure provide advantages over conventional techniques for power factor correction. For example, an advantage over a conventional technique is that the total harmonic distortion (THD) and power factor (PF) can be optimized for different applications by setting a value of a phase factor α. Referring to FIG. 8, for applications requiring a low THD, the phase factor α can be set to a lower value (e.g., α=0.3). For applications that require a higher PF without requiring a lowest possible THD, the phase factor α can be set to a higher value (e.g., α=0.6). In an embodiment, the phase factor α may be an analog or digital parameter for a SMPS controller. As such, a SMPS manufacturer is provided with flexibility to optimize a power supply to his requirements.

Figure 11A:
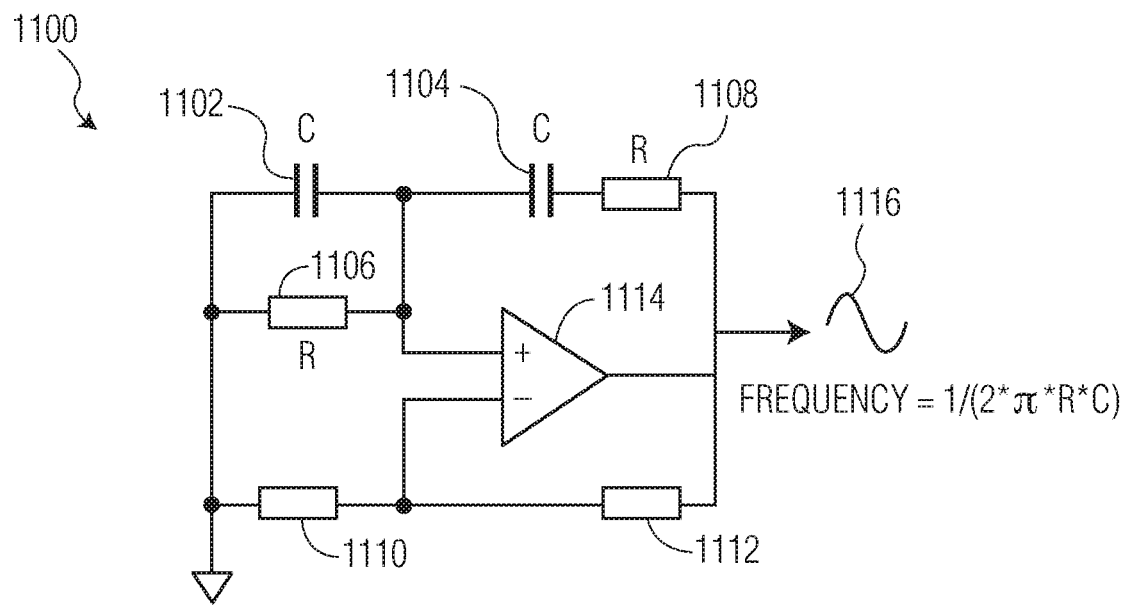
FIG. 11A depicts an example of an analog reference signal generating circuit and FIG. 11B depicts an example of a digital reference signal generating circuit.
Figure 11B:
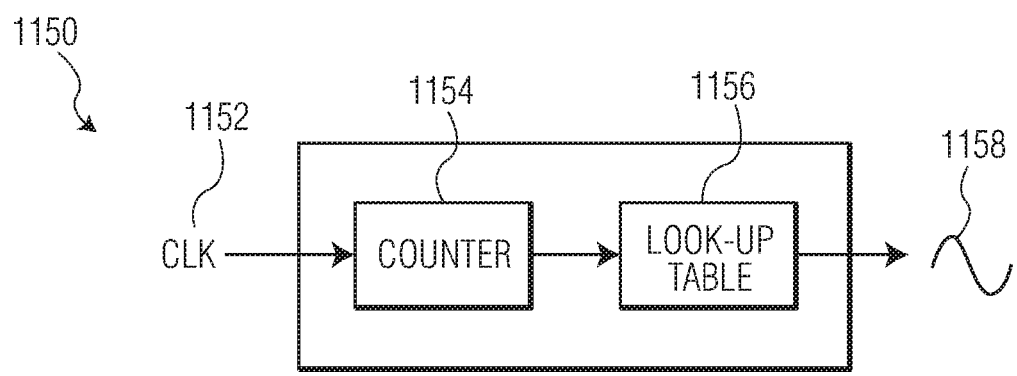

FIG. 11A depicts an example of an analog reference signal generating circuit 1100 and FIG. 11B depicts an example of a digital reference signal generating circuit 1150. In an embodiment, the reference signal generating circuit 902 of FIG. 9 and/or the reference signal generating circuit 1002 of FIG. 10 may be implemented as either of the analog reference signal generating circuit 1100 or the digital reference signal generating circuit 1150.

As shown in FIG. 11A, the analog reference signal generating circuit 1100 encompasses a number of elements including a first capacitor 1102, a second capacitor 1104, a first resistor 1106, a second resistor 1108, a third resistor 1110, a fourth resistor 1112, and a comparator 1114. Upon receiving an input (e.g., mains input voltage (Vac)), an arrangement of the elements enables the analog reference signal generating circuit 1100 to generate a reference signal 1116 (e.g., sine wave reference signal (ref)). In an embodiment, a frequency of the reference signal 1116 may be determined by an equation: Frequency=$1/(2*\pi*R*C)$, where R is a value of the first resistor 1106 and the second resistor 1108, and C is a value of the first capacitor 1102 and the second capacitor 1104.

As shown in FIG. 11B, the digital reference signal generating circuit 1150 includes a digital counter 1154 and a look-up table 1156. A clock signal (clk) 1152 feeds into the digital counter 1154. The digital counter 1154 feeds an input to the look-up table 1156. The look-up table 1156 outputs a reference signal 1158 (e.g., sine wave reference signal (ref)) based on the input from the digital counter 1154.

Figure 12:
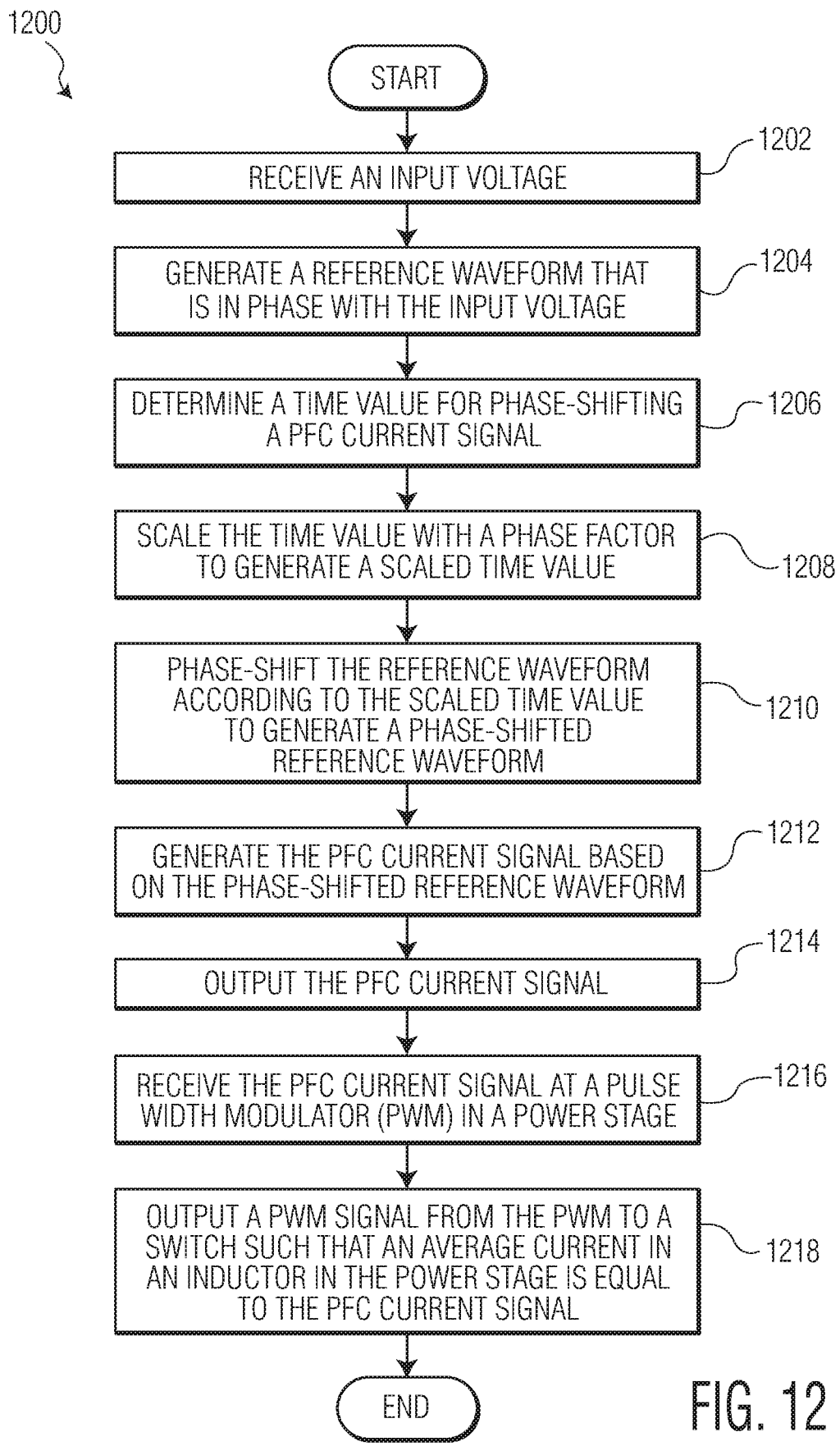
FIG. 12 is a process flow diagram of an example method for power factor correction (PFC) at a switched mode power supply (SMPS).

FIG. 12 is a process flow diagram 1200 of an example method for power factor correction (PFC) at a switched mode power supply (SMPS). In an embodiment, at block 1202, the method involves receiving an input voltage (e.g., mains input voltage Vac). For example, the reception of the input voltage is performed by a reference signal generating circuit (e.g., reference signal generating circuit 902 or reference signal generating circuit 1002).

At block 1204, the method involves generating a reference waveform that is in phase with the input voltage. For example, the generation of the reference waveform is performed by the reference signal generating circuit (e.g., reference signal generating circuit 902 or reference signal generating circuit 1002).

At block 1206, the method involves determining a time value for phase-shifting a PFC current signal. For example, the determination of the time value is performed by a processing circuit (e.g., processing circuit 940 or digital processor 1040).

In an embodiment, the method involves determining the time value for phase-shifting the PFC current signal according to an equation: time value=$\arctan(C*\omega*Vac/Iac)/\omega$, where C is a total capacitance of one or more EMI filter capacitors in the SMPS, $\omega$ is a frequency of the input voltage, Vac is the input voltage, and Iac is a regulating current signal. In an embodiment, the regulating current signal regulates an output voltage of the SMPS to a target reference voltage.

In an embodiment, the method involves determining the time value for phase-shifting the PFC current signal by generating an input current waveform based on a frequency of the input voltage and a regulating current signal, and generating a capacitor current waveform based on the input voltage, the frequency of the input voltage, and a total capacitance of the one or more EMI filter capacitors. The method then compares the capacitor current waveform to the input current waveform and determines the time value based on a time when the input current waveform is equal to the capacitor current waveform.

In an embodiment, the method involves generating the input current waveform according to an equation: input current waveform=$Iac*\sin(\omega t)$, where Iac is the regulating current signal, $\omega$ is the frequency of the input voltage, and t is a value greater than 0. In an embodiment, the method involves generating the capacitor current waveform according to an equation: capacitor current waveform=$C*\omega*Vac*\cos(\omega t)$, where C is the total capacitance of the one or more EMI filter capacitors, $\omega$ is the frequency of the input voltage, Vac is the input voltage, and t is a value greater than 0.

At block 1208, the method involves scaling the time value with a phase factor to generate a scaled time value. For example, the scaling of the time value is performed by a scaling circuit (e.g., scaling circuit 914 or scaling circuit 1014). In an embodiment, the phase factor is a value greater than 0 and less than 1.

At block 1210, the method involves phase-shifting the reference waveform according to the scaled time value to generate a phase-shifted reference waveform. For example, the phase-shifting of the reference waveform is performed by a phase-shifted signal generating circuit (e.g., phase-shifted signal generating circuit 918 or phase-shifted signal generating circuit 1018).

At block 1212, the method involves generating the PFC current signal based on the phase-shifted reference waveform. For example, the generation of the PFC current signal is performed by a PFC signal generating circuit (e.g., PFC signal generating circuit 942 or PFC signal generating circuit 1042). In an embodiment, the PFC current signal is generated by multiplying the phase-shifted reference waveform with a regulating current signal to generate a phase-shifted current signal and rectifying the phase-shifted current signal to generate the PFC current signal.

At block 1214, the method involves outputting the PFC current signal. For example, the output of the PFC current signal is performed by a switching circuit (e.g., switch 924 or switch 1024). In an embodiment, the method involves outputting the PFC current signal when both the input voltage and a voltage of the phase-shifted reference waveform have a value greater than zero, or when both the input voltage and the voltage of the phase-shifted reference waveform have a value less than zero.

In an embodiment, the SMPS includes a power stage (e.g., power stage 944 or power stage 1044). Accordingly, at block 1216, the method involves receiving the PFC current signal at a pulse width modulator (PWM) (e.g., PWM 930 or PWM 1030) in the power stage.

At block 1218, the method involves outputting a PWM signal from the PWM to a switch (e.g., switch 932 or switch 1032) such that an average current in an inductor (e.g., inductor 934 or inductor 1034) in the power stage is equal to the PFC current signal.

The above-described operations of a switched mode power supply configured for power factor correction can be implemented in hardware, firmware, or a combination thereof, or implemented in a combination of hardware and software, or implemented in a combination of firmware and software, or implemented in a combination of hardware, firmware, and software.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for power factor correction (PFC) at a switched mode power supply (SMPS), the method comprising:
   receiving an input voltage;
   generating a reference waveform that is in phase with the input voltage;
   determining a time value for phase-shifting a PFC current signal;
   scaling the time value with a phase factor to generate a scaled time value;
   phase-shifting the reference waveform according to the scaled time value to generate a phase-shifted reference waveform; and
   generating the PFC current signal based on the phase-shifted reference waveform.

2. The method of claim 1, wherein the time value is determined according to an equation:

time value=arctan($C*\omega*Vac/Iac$)/$\omega$, where C is a total capacitance of one or more electromagnetic interference (EMI) filter capacitors in the SMPS, $\omega$ is a frequency of the input voltage, Vac is the input voltage, and Iac is a regulating current signal.

3. The method of claim 2, wherein the regulating current signal regulates an output voltage of the SMPS to a target reference voltage.

4. The method of claim 1, wherein the phase factor is a value greater than 0 and less than 1.

5. The method of claim 1, wherein generating the PFC current signal based on the phase-shifted reference waveform comprises:
   multiplying the phase-shifted reference waveform with a regulating current signal to generate a phase-shifted current signal; and
   rectifying the phase-shifted current signal to generate the PFC current signal.

6. The method of claim 5, further comprising outputting the PFC current signal when:
   both the input voltage and a voltage of the phase-shifted reference waveform have a value greater than zero; or
   both the input voltage and the voltage of the phase-shifted reference waveform have a value less than zero.

7. The method of claim 1, wherein the SMPS includes a power stage, the method further comprising:
   receiving the PFC current signal at a pulse width modulator (PWM) in the power stage; and
   outputting a PWM signal from the PWM to a switch such that an average current in an inductor in the power stage is equal to the PFC current signal.

8. The method of claim 1, wherein determining the time value for phase-shifting the PFC current signal comprises:
   generating an input current waveform based on a frequency of the input voltage and a regulating current signal;
   generating a capacitor current waveform based on the input voltage, the frequency of the input voltage, and a total capacitance of one or more electromagnetic interference (EMI) filter capacitors in the SMPS;
   comparing the capacitor current waveform to the input current waveform; and
   determining the time value based on a time when the input current waveform is equal to the capacitor current waveform.

9. The method of claim 8, wherein the input current waveform is generated according to an equation:

input current waveform=$Iac*\sin(\omega t)$, where Iac is the regulating current signal, $\omega$ is the frequency of the input voltage, and t is a value greater than 0.

10. The method of claim 8, wherein the capacitor current waveform is generated according to an equation:

capacitor current waveform=$C*\omega*Vac*\cos(\omega t)$, where C is the total capacitance of the one or more EMI filter capacitors, $\omega$ is the frequency of the input voltage, Vac is the input voltage, and t is a value greater than 0.

11. A switched mode power supply (SMPS) configured for power factor correction (PFC), comprising:
    a reference signal generating circuit configured to receive an input voltage and generate a reference waveform that is in phase with the input voltage;
    a processing circuit configured to determine a time value for phase-shifting a PFC current signal;
    a scaling circuit configured to scale the time value with a phase factor to generate a scaled time value;
    a phase-shifted signal generating circuit configured to phase-shift the reference waveform according to the scaled time value to generate a phase-shifted reference waveform; and
    a PFC signal generating circuit configured to generate the PFC current signal based on the phase-shifted reference waveform.

12. The SMPS of claim 11, wherein the processing circuit is configured to determine the time value according to an equation:

time value=arctan($C*\omega*Vac/Iac$)/$\omega$, where C is a total capacitance of one or more electromagnetic interference (EMI) filter capacitors in the SMPS, $\omega$ is a frequency of the input voltage, Vac is the input voltage, and Iac is a regulating current signal.

13. The SMPS of claim 12, wherein the regulating current signal regulates an output voltage of the SMPS to a target reference voltage.

14. The SMPS of claim 11, wherein the phase factor is a value greater than 0 and less than 1.

15. The SMPS of claim 11, wherein the PFC signal generating circuit configured to generate the PFC current signal is further configured to:

multiply the phase-shifted reference waveform with the regulating current signal to generate a phase-shifted current signal; and rectify the phase-shifted current signal to generate the PFC current signal.

16. The SMPS of claim 15, further comprising a switching circuit configured to output the PFC current signal when:

both the input voltage and a voltage of the phase-shifted reference waveform have a value greater than zero; or both the input voltage and the voltage of the phase-shifted reference waveform have a value less than zero.

17. The SMPS of claim 11, further comprising:

a power stage comprising a pulse width modulator (PWM), a switch coupled to the PWM, and an inductor coupled to the switch, wherein the PWM is configured to:

receive the PFC current signal, and output a PWM signal to the switch such that an average current in the inductor is equal to the PFC current signal.

18. The SMPS of claim 11, wherein the processing circuit configured to determine the time value is further configured to:

generate an input current waveform based on a frequency of the input voltage and a regulating current signal;

generate a capacitor current waveform based on the input voltage, the frequency of the input voltage, and a total capacitance of one or more electromagnetic interference (EMI) filter capacitors in the SMPS;

compare the capacitor current waveform to the input current waveform; and determine the time value based on a time when the input current waveform is equal to the capacitor current waveform.

19. The SMPS of claim 18, wherein the processing circuit is configured to generate the input current according to an equation:

input current waveform=$I_{ac}*\sin(\omega t)$, where Iac is the regulating current signal, $\omega$ is the frequency of the input voltage, and t is a value greater than 0.

20. The SMPS of claim 18, wherein the processing circuit is configured to generate the capacitor current waveform according to an equation:

capacitor current waveform=$C*\omega*V_{ac}*\cos(\omega t)$, where C is the total capacitance of the one or more EMI filter capacitors, $\omega$ is the frequency of the input voltage, Vac is the input voltage, and t is a value greater than 0.

* * * * *